March 10, 1970     W. J. HALL     3,499,708
SLIDE PROJECTOR AND MAGAZINE THEREFOR
Filed Nov. 20, 1967     7 Sheets-Sheet 1

INVENTOR
WALTER J. HALL
BY *Dreist, Lockwood, Greenawalt & Dewey*
ATT'YS.

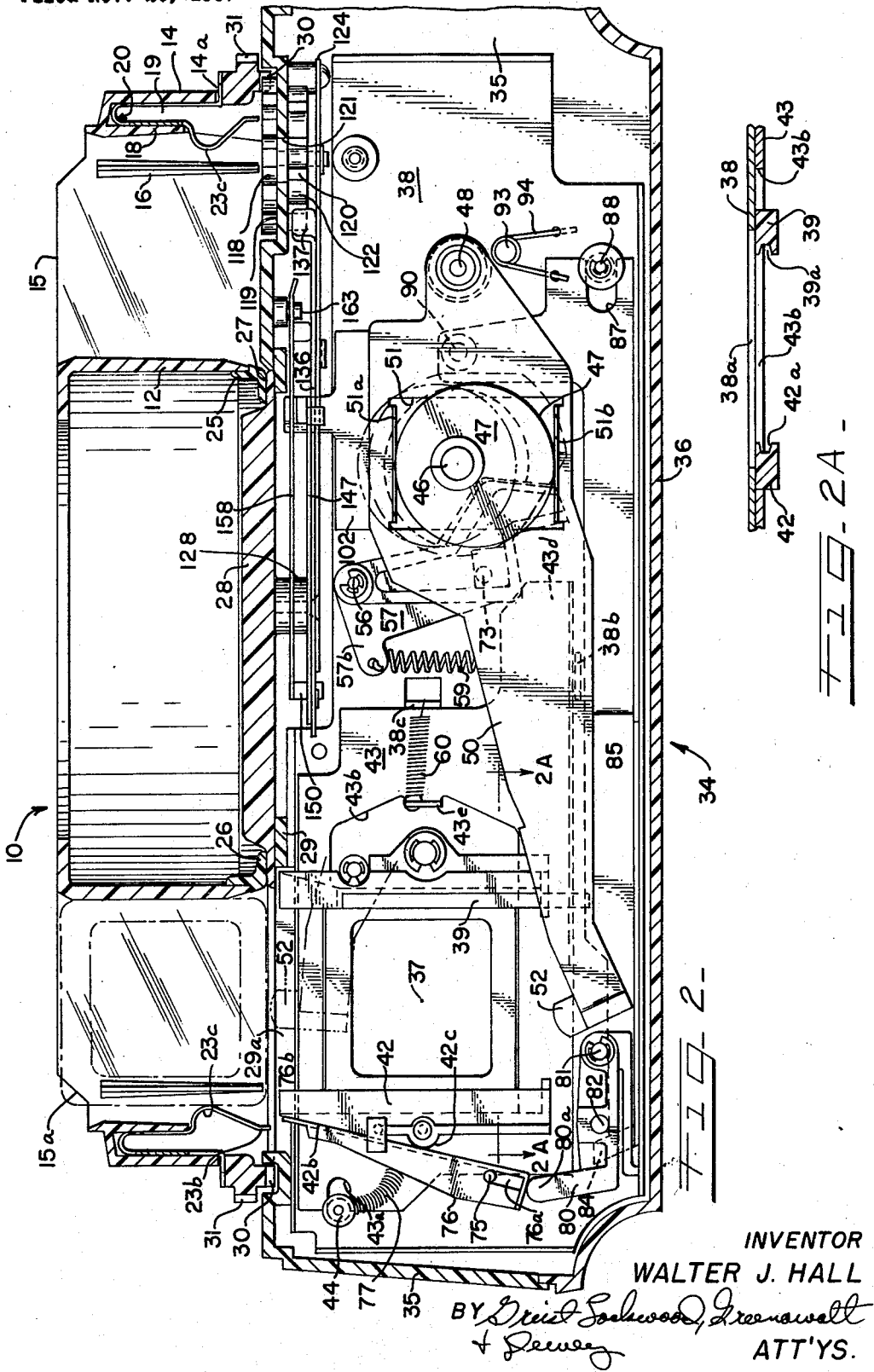

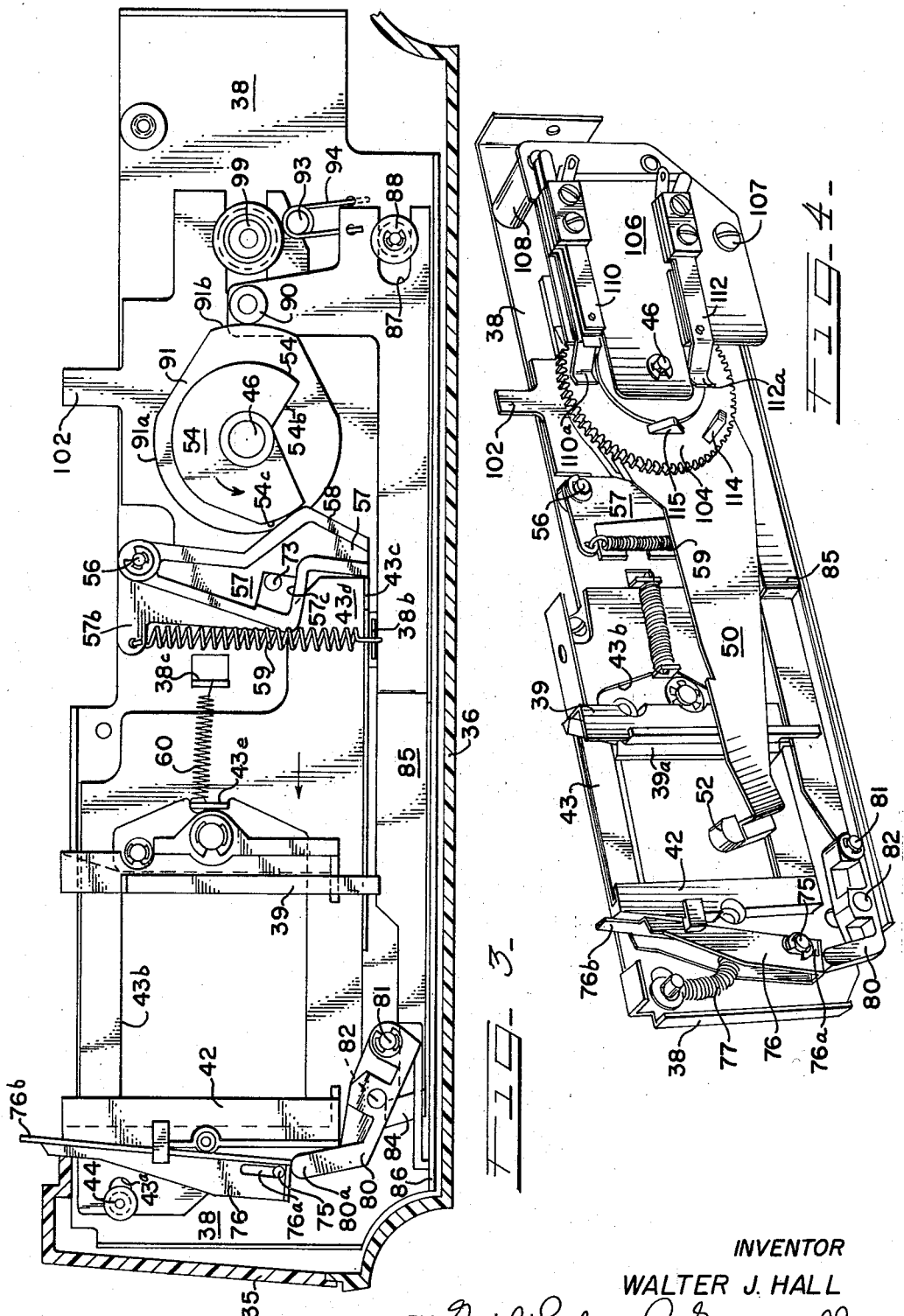

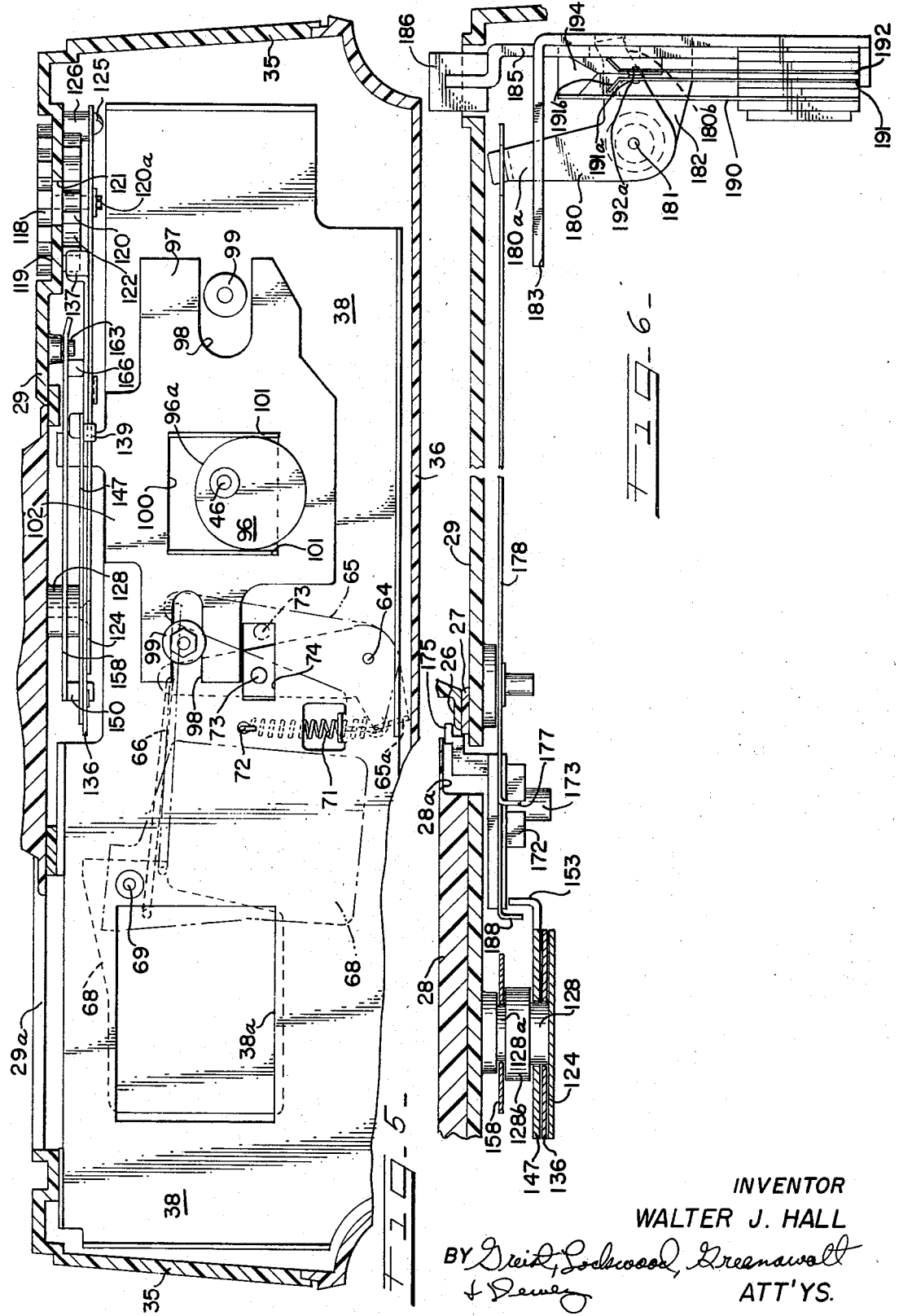

March 10, 1970 W. J. HALL 3,499,708
SLIDE PROJECTOR AND MAGAZINE THEREFOR
Filed Nov. 20, 1967 7 Sheets-Sheet 5

INVENTOR
WALTER J. HALL
BY Dreist Lockwood, Greenawalt
& Dewey
ATT'YS.

March 10, 1970  W. J. HALL  3,499,708
SLIDE PROJECTOR AND MAGAZINE THEREFOR
Filed Nov. 20, 1967  7 Sheets-Sheet 6

INVENTOR
WALTER J. HALL
BY
ATT'YS.

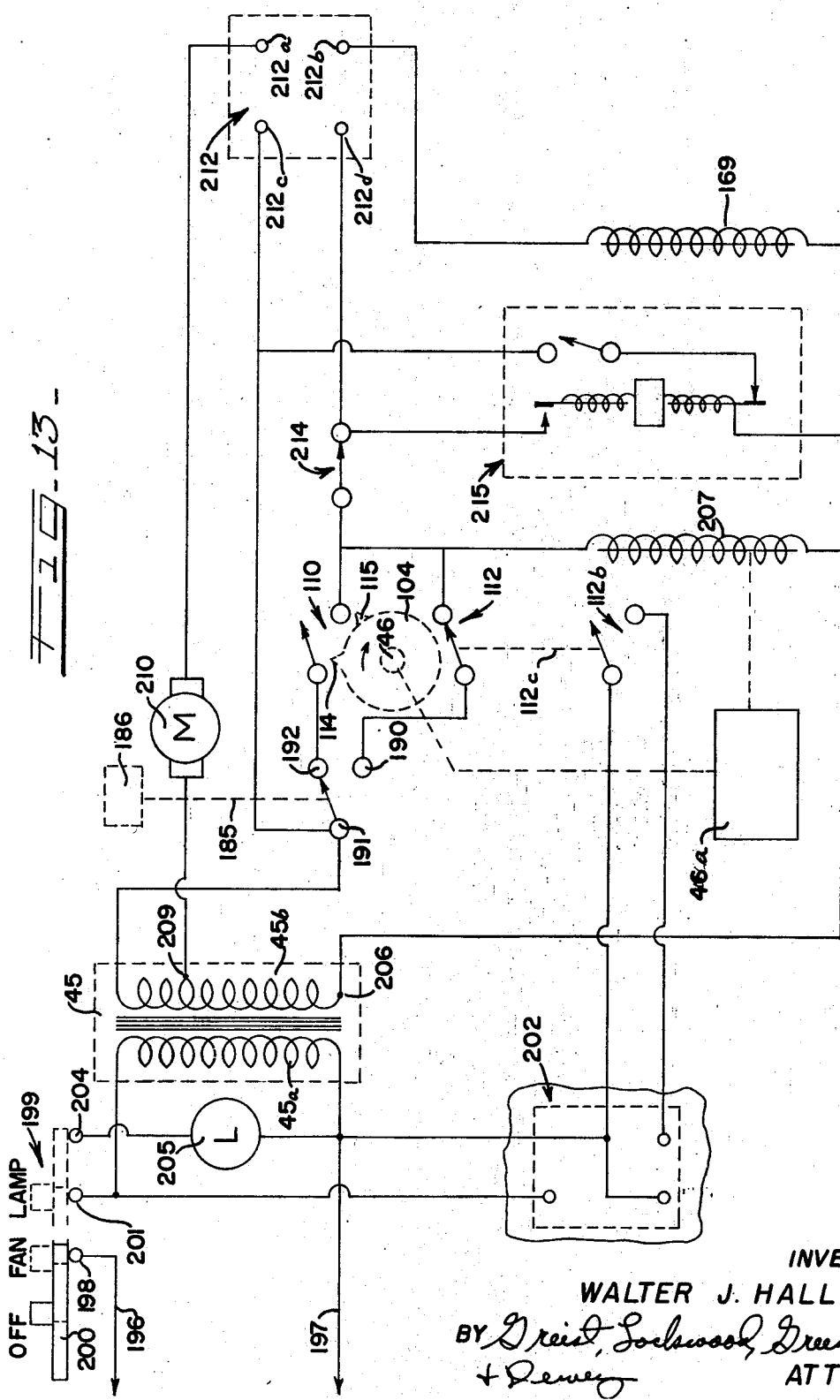

United States Patent Office 3,499,708
Patented Mar. 10, 1970

3,499,708
SLIDE PROJECTOR AND MAGAZINE THEREFOR
Walter J. Hall, Chicago, Ill., assignor to GAF Corporation, a corporation of Delaware
Continuation-in-part of application Ser. No. 554,071, May 31, 1966. This application Nov. 20, 1967, Ser. No. 684,202
Int. Cl. G03b 23/06, 23/02
U.S. Cl. 353—107          10 Claims

ABSTRACT OF THE DISCLOSURE

The projector includes a vertically disposed projection gate located adjacent one side of the projector housing. The housing has a top wall portion with a slot therein disposed over the gate for entry of a slide thereinto and for exit of a slide therefrom. The projection gate includes a pair of vertically extending slide guides. One of these guides is mounted for movement toward and away from the other guide for alternately releasing and gripping a slide at the side edges thereof. The movable guide contacts a slide-releasing arm which causes release of a slide in the magazine thereby allowing such slide to drop into the gate. The rotary slide magazine has a plurality of slide-receiving spaces which are open at the tops and bottoms. A spring finger is mounted in each slide-receiving space for yieldable engagement with a side edge of a slide for releasably retaining the slide in its space in the magazine. When a slide is positioned over the housing slot which is in turn located over the projection gate, and when the spring finger biasing such slide is contacted by the aforementioned slide-releasing member, the slide is allowed to drop into the gate. The magazine includes an indexing gear engaged with a series of teeth on the magazine for indexing the magazine in forward and reverse directions. The indexing gear is rotated in either direction by indexing means in the projector, such indexing means including a locking member which is yieldably urged into its locked position and positively withdrawn to an unlocked position. The projector includes a cam-operated lifting member to return the slide in the projection gate to its place in the magazine. The projector also includes an operating member or "Load" button. When this member is depressed, the indexing means are disabled and a latch is withdrawn permitting separation of the magazine from the projector.

BACKGROUND OF THE INVENTION

This application is a continuation-in-part of my application, Ser. No. 554,071, filed May 31, 1966, now abandoned. The present invention relates to a new and improved slide projector and slide magazine therefor. In particular, the present invention has to do with improvements in a projector of the type adapted to have a slide magazine mounted over the projection gate for movement in a horizontal path such that successive slides are allowed to drop into the gate and then are mechanically lifted by a member in the projector for return to the magazine.

OBJECTS OF THE INVENTION

A primary object of the present invention is to provide in a slide projector of the type described, new and improved slide changing means.

Another primary object of the present invention is the provision of a new and improved slide magazine wherein each of the slide-receiving spaces therein is open at the top and bottom thereof thereby permitting loading and editing of the slides at the top of the magazine and releasing and returning of slides at the bottom of the magazine, and wherein each of said spaces includes improved slide-retaining means.

Still another object of the present invention is the provision of a slide projector having new and improved slide changing mechanism adapted to cooperate with the aforementioned slide-retaining means in a novel manner.

A further object of the present invention is the provision of a slide projector according to the foregoing objects wherein means are provided for alternately expanding and contracting the slide projection gate thereby respectively to release and grip a slide therein, wherein such means also serve to operate the slide-releasing means.

Still another object of the present invention is to provide in a projector of the type described, new and improved means for indexing a slide magazine in forward and reverse directions along a path.

Another object of the present invention is to provide means allowing selective disabling of the magazine indexing means.

A still further object of the present invention is the provision of releasable latch means for preventing separation of a magazine from a projector of the type described, and also to provide a control member for activating the aforementioned disabling means and for substantially simultaneously withdrawing the latch means thereby to permit separation of the magazine from the projector.

These and other objects and advantages of the invention will become apparent from the following specification disclosing a preferred embodiment of the invention shown in the accompanying drawings.

DESCRIPTION OF THE DRAWINGS

FIG. 2 is an enlarged section taken generally along the line 2—2 of FIG. 1;

FIG. 2A is a section taken along line 2A—2A of FIG. 2;

FIG. 3 is a section similar to FIG. 2 (except the slide magazine and certain parts of the projector are not illustrated) primarily showing the slide-releasing means, the expandable and contractable projection gate, and the cam means for operating these components;

FIG. 4 is a perspective view of a sub-assembly primarily consisting of the slide changing mechanism;

FIG. 5 is a section similar to FIG. 3 primarily showing the shutter mechanism and the slide-indexing means;

FIG. 6 is a section taken generally along the line 6—6 of FIG. 1 and primarily showing the magazine latch, the disabling means associated with the slide-indexing mechanism, the manual operating member or "Load" button and related linkage;

FIG. 13 is a schematic drawing showing the electrical system in the projector.

DESCRIPTION OF THE PREFERRED EMBODIMENT

(a) The slide magazine

Figure 7:
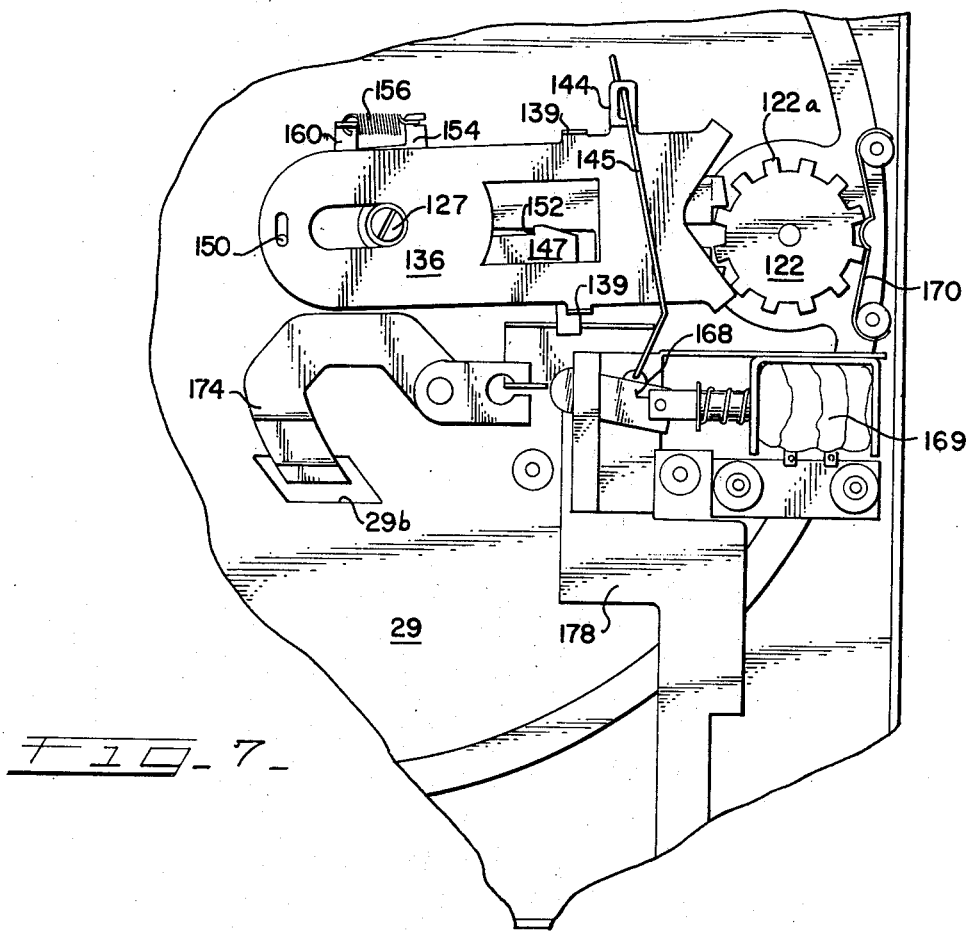
FIG. 7 is a fragmentary bottom plan view as seen looking at the underside of the top wall portion of the projector housing and showing the indexing mechanism, the magazine latch and the linkage associated with the disabling means.
Figure 1:
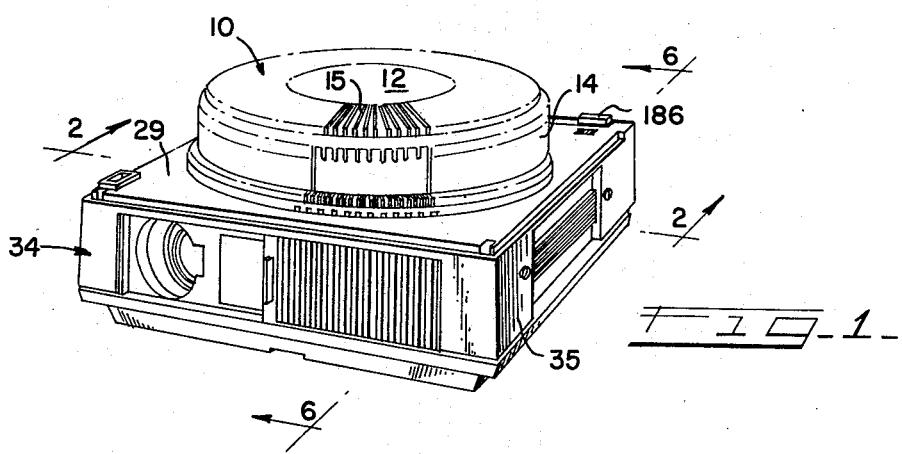
FIG. 1 is a perspective view of a slide magazine and slide projector incorporating the present invention.
Figure 9:
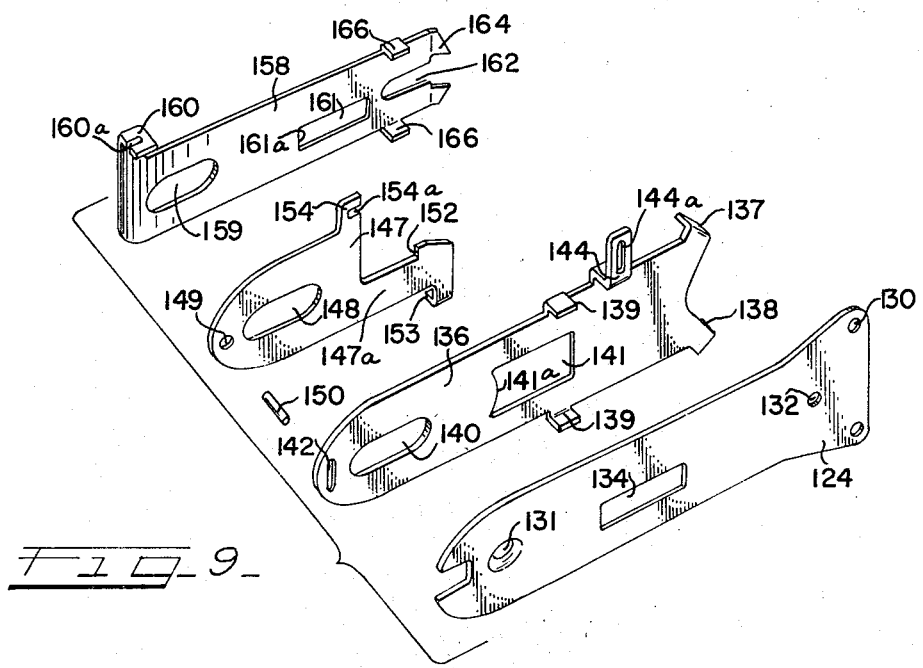
FIG. 9 is an exploded perspective of the main components of the slide-indexing mechanism.

Referring now to FIGS. 1, 2 and 10 through 12, the embodiment of the slide magazine of this invention which is shown for purposes of illustration is generally designated 10 and will be seen to comprise concentric, inner and outer cylindrical walls 12 and 14, respectively. The magazine is preferably of molded construction and includes a plurality of radially extending partitions or septums 15 extending between the inner and outer walls thereby defining a plurality of circumferentially spaced slide-receiving spaces. Each partition 15 includes on each face thereof an axially extending rib 16 adjacent the outer wall 14. As best noted in FIG. 12, each slide-receiving space includes a pair of these ribs which engage opposite faces of a slide 17; the ribs compensate for the outwardly diverging arrangement of the partitions thereby to support the slides substantially in vertical planes.

Figure 11:
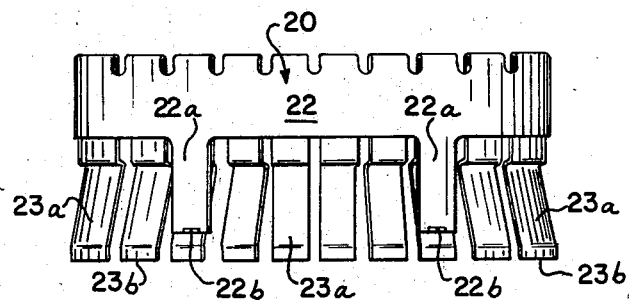
FIG. 11 is an enlarged elevation of one of the spring retainer members for the slide magazine.
Figure 12:
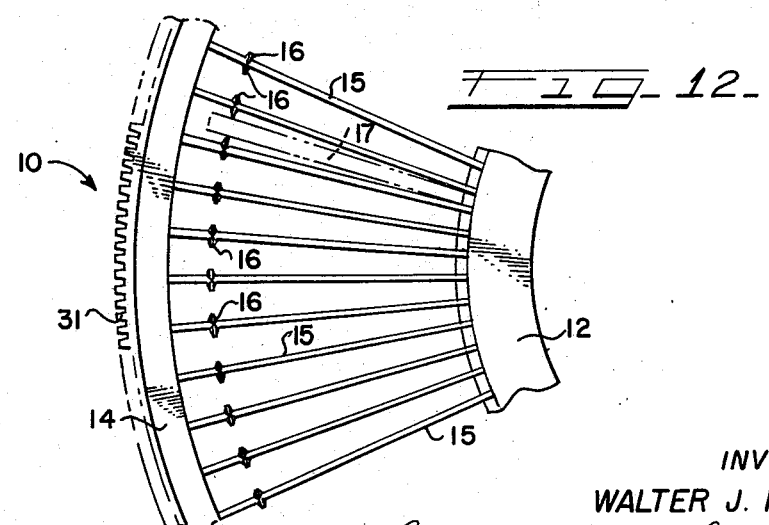
FIG. 12 is an enlarged, fragmentary top plan view of the slide magaizne.

The magazine 10 includes an integral, cylindrical partition 18 defining with outer wall 14 a downwardly opening annular space 19. A plurality of spring clip retainers 20 are secured in this annular space 19 in the magazine; one of such clips is shown in FIG. 11. This retainer is of generally inverted, U-shape in cross-section including an outer leg 22 and an inner leg 23 which is defined in part by a plurality of spring fingers 23a each bent at its lower or distal end 23b. Leg 22 includes a pair of integral, depending legs 22a, each of which legs has an outwardly bent tab 22b. It will be understood that a plurality of the spring clip retainers are bent into arcuate form along their lengths and fitted into the annular space 19 in end-to-end relation with one of the spring fingers 23a being received in each of the slide-receiving spaces defined by the partitions 15. The tabs 22b are received within small apertures 14a (FIGS. 2 and 10) formed in the outer wall of the magazine for securing each of the spring clip retainers 22 in place. As best seen in FIG. 2, each spring finger 23a has a rounded portion 23c which yieldably engages a side edge of a slide for biasing the same between such rounded portion and the inner wall 12 of the magazine thereby retaining the slide in its slide-receiving space in the magazine.

Inner wall 12 of the magazine mounts a ring 25 having an inwardly extending flange 26 provided with a planar bottom surface for slidably supporting the magazine on a flange 27 integral with a hub 28 forming part of the housing of the slide projector to be described hereinbelow. The flange 26 rotatably engages the periphery of a hub member 28 which is suitably secured to the top wall 29 of the projector. This engagement between the ring flange 26 and the hub 28 serves to center the magazine for rotation about its vertical central axis which is coaxial with the vertical central axis of the hub 28.

The magazine further includes an annular series of downwardly extending teeth 30 formed integrally with outer wall 14. These teeth cooperate with the slide projector indexing mechanism to be explained in detail hereinbelow. The magazine also includes another series of radially extending teeth 31 integral with wall 14. The teeth 31 adapt the magazine to be rotated by the Random Access Attachment disclosed and claimed in the application of Frank P. Bennett, Ser. No. 672,214, filed Oct. 2, 1967.

It will be noted that each of the slide-receiving spaces formed by a pair of the partitions 15 is open at the top thereof and also open at the bottom thereof. This feature permits loading and editing of slides at the top of the magazine and releasing and returning of slides at the bottom of the magazine. It will be appreciated a slide can be readily forced into each of the slide-receiving spaces at either the top or bottom of the magazine as the slide will engage the spring finger adjacent the rounded portion 23c thereby to deflect the finger laterally permitting entry of the slide. As best noted in FIG. 2, each of the partitions 15 is cut away, as at 15a, thereby facilitating grasping of slides at the corners thereof for easy loading and editing. It will also be noted that a slide can be released for dropping from the magazine merely by deflecting one of the fingers 23a just a short distance away from the slide. The end 23b of each finger is spaced horizontally outwardly of the slide to permit ready engagement by a releasing arm as will be explained below.

(b) The slide changing mechanism

The slide projector of this invention, generally designated 34, includes a box-like housing or casing defined by four side walls 35 which join with the top wall 29. The housing has a bottom wall 36. The projector includes the usual means (not shown), i.e., a lamp and a number of lenses, defining the projector optical axis 37 (FIG. 2). Such means are not described herein as they are of well-known construction and of themselves form no part of the present invention. Mounted within the projector housing in a fixed position and in a plane perpendicular to the optical axis 37 is a partition plate 38 which extends completely across the housing between opposite side walls 35. This partition plate has a rectangular opening 38a (FIG. 5) forming part of the projection gate. As best noted in FIGS. 2 through 4, the projection gate is further defined by a vertically disposed slide guide 39 having a vertically extending groove 39a (FIG. 2A) for slidably receiving one side edge of a photographic slide mount. It will be understood that the guide 39 is fixedly mounted by the partition plate 38.

The projection gate has another vertically extending slide guide 42 which is mounted on a plate 43. The plate 43 is supported on the partition plate 38 for limited, horizontal reciprocal sliding movement relative thereto by suitable means such as a slot 43a in the plate slidably engaging a fastener 44 supported by the partition plate 38 and by a tab 38b which slidably engages the underedge of the plate 43. From FIG. 2A it will be noted that the slide guide 42 includes a vertically extending groove 42a for slidable engagement with a side edge of a photographic slide mount. Movement of the slide guide 42, by corresponding movement of its supporting plate 43, serves to expand and contract the projection gate for respective releasing and gripping of a slide by reason of an inclined surface 42b and a projection 42c as will be explained in greater detail below. It should be noted that the plate 43 includes a generally rectangular opening 43b.

The projector includes an electric motor (shown only schematically in FIG. 13 and designated 45) of known construction; this motor, through the medium of a solenoid operated clutch (also shown only schematically in FIG. 13 and designated 46a), drives a shaft 46 and a cam 47 eccentrically mounted thereon, the cam having a circular cam track 47a. The partition plate mounts a pin 48, which pin pivotally engages one end of a slide-lifting lever 50. Lifting lever 50 includes a rectangular opening 51 having bent flanges 51a, 51b at its respective upper and lower edges, which flanges are slidably engaged by the cam surface 47a. It should be apparent that when the cam 47 has been rotated from its solid line position to its phantom line position (FIG. 2), i.e., upon rotation of the shaft 46 through 180°, the arm 50 will be moved from its solid line position shown to its phantom line position illustrated in FIG. 2. The lifting lever 50 includes a foot 52 arranged to engage a bottom of a slide for lifting the later from the projection gate and returning the same to its slide-receiving space in the magazine 10.

Referring now primarily to FIG. 3, the shaft 46 mounts another cam 54. This cam has a circular cam surface 54a interrupted by a recessed cam surface 54b and an adjacent cam lobe 54c. The partition plate 38 supports a pin 56 which in turn pivotally supports a rocker arm 57. This rocker arm has a depending leg 57a which carries a cam follower 58, the latter being arranged to be engaged by the various cam surfaces of the cam 54. The other leg 57b of the rocker arm includes a small aperture engaged by one end of a coil spring 59, the other end of this spring being connected to the tab 38b formed integrally with the partition plate 38. It should be readily apparent that the spring 59 urges the rocker arm in a counterclockwise direction for maintaining the cam follower 58 in engagement with the cam surface on the cam 54. From FIG. 3, it will be understood that the lowermost end of the leg 57a is arranged for abutting engagement with a flange 43c bent at a right angle from an extension 43d of the plate 43 of the actuating plate. A spring 60 has one end thereof connected to a tab 43e on the plate 43 and the other end thereof connected to a tab 38c struck from the partition plate; this spring urges the plate 43 to the right for maintaining the cam following tab 43c in engagement with the end 57a of the rocker arm during a portion of movement of the latter. As noted in FIG. 2, the tab 38c also serves as a stop against movement of the plate 43 to the right. The purpose of this construction will be explained hereinbelow. It will be observed that leg 57a of the rocker arm includes an opening 57c. This opening adapts the rocker arm 57 to operate the shutter as will be explained hereinbelow.

The partition plate 38 mounts a pin 64 (FIG. 5); this pin pivotally mounts an arm 65 adjacent the side of the partition plate opposite the side thereof against which the rocker arm 57 is mounted. The upper end of arm 65 is pivotally engaged with one end of a stiff wire 66, the other end of this wire being pivotally received in a small aperture formed in a shutter plate 68. The shutter is pivotally mounted about a pin 69, this pin being supported by the partition plate 38. The arm 65 has an integral tab 65a extending at a right angle to the plane of the former; this tab is engaged by one end of a coil torsion spring 71. The other end of this spring is received in an opening 72 formed in the partition plate 38. It will be understood that the spring 71 tends to urge the shutter 68 to its closed position. The arm 65 carries a pin 73 which is received in the opening 57c of the rocker arm thereby to control movement of the shutter against the force of the spring 71; this will be explained in greater detail herein. The partition plate 38 has a slot 74 therein to accommodate movement of the pin 73.

Returning now to FIG. 2, the partition plate 38 supports a pin 75 which slidably and pivotally mounts one end of a slide-releasing arm 76, the latter being provided with a slot 76a which receives the pin 75. A coil spring 77 (FIG. 4) has one of its ends biased against the adjacent inside housing wall 35 and the other of its ends biased against the inside surface of the web of the arm 76 which is generally U-shaped in horizontal cross-section. It will be appreciated that the spring 77 acts to urge the slide-releasing arm 76 in a clockwise direction about the pin 75. Movement of the arm 76 is limited in this direction by the engagement thereof with an inclined surface 42b on the slide guide 42.

It will be observed that the slide-releasing arm 76 has an upper end 76b which extends upwardly through one end of a slot 29a formed in the top projector wall 29; this slot is arranged over the projection gate defined by the guides 39, 42, etc.

As best noted in FIGS. 2 through 4, an elevating member 80 engages the releasing arm 76 for lifting the latter at the proper time to enable the end 76b of the releasing arm to engage and deflect one of the spring fingers 23a for releasing a slide as will be explained hereinbelow. The elevating member 80 is a generally right angle shaped member having a tip 80a arranged to engage the lower end of the slide-release arm 76. The other end of the elevating member 80 is pivotally mounted about a pin 81, the latter being suitably mounted from the partition plate 38. The elevating member carries a cam following pin 82 positioned to be engaged by an inclined cam surface 84 formed integrally on one end of a cross-bar 85.

The cross-bar 85 is mounted for reciprocal sliding movement transversely of the projector. This is achieved by slidably resting one end of the cross-bar 85 on a suitable slide 86 mounted on the bottom 36 of the projector housing and by providing the other end of the cross-bar 85 with an open ended slot 87 slidably receiving a fastener 88, the latter being mounted from the partition plate. The cross-bar includes an upstanding portion 85a mounting a cam follower in the form of a roller 90, the latter being adapted to be engaged by a cam 91 mounted on the shaft 46 behind the cam 54. The cam 91 includes an arcuate cam surface 91a joining with a cam lobe having a cam surface 91b. The partition plate 38 mounts a pin 93 supporting a coil spring 94 having opposite ends thereof received in respective apertures in the partition plate 38 and cross-bar 85 for biasing the latter to the left thereby holding the cam follower 90 in engagement with the cam surfaces on the cam 91. It will be understood that when cam surface 91b comes into engagement with the cam follower 90, the cross-bar 85 is shifted to the right thereby bringing the cam 84 into engagement with the cam follower 82 and rocking the elevating member 80 in a counterclockwise direction about the supporting pin 81 for lifting the slide-releasing arm 76 to allow the upper end 76b thereof to contact the lower end 23b of one of the spring fingers in the magazine.

Referring now to FIG. 5, it will be observed the shaft 46 mounts another cam 96, the latter being eccentric with respect to the shaft and including a circular cam surface 96a. An indexing mechanism operating plate 97 is mounted adjacent one side of the partition plate 38 for horizontal reciprocal movement relative to the latter. To this end, the plate 97 includes oppositely disposed open ended slots 98 slidably receiving fasteners 99 supported by the partition plate. The operating plate 97 includes a square opening 100, the opposite side edges thereof being defined by flanges 101 which are bent from the plate 97 at a right angle thereto and which engage the circular cam surface 96a. It will be understood the cam 96 is not contained within the opening 100 but is disposed adjacent one side of the plate 97 in engagement with the flanges 101 whereby the plate 97 is imparted with horizontal reciprocal movement in response to rotation of the cam 96 during corresponding rotation of the shaft 46. It will be observed the operating plate 97 includes an upwardly extending tab 102; this tab serves to operate the slide-indexing mechanism as will be explained below.

FIG. 4 shows the entire slide changing mechanism mounted as a sub-assembly. The shaft 46 carries a gear 104 which is in meshing engagement with a pinion gear (not shown) forming part of the drive from the electric motor in the projector. As mentioned above, the shaft 46 is driven by the motor 45 through the medium of the solenoid actuated clutch 46a.

The partition plate 38 carries another plate 106, the latter being mounted in parallel spaced relation with the partition plate by means of fasteners 107 and spacers 108. The plate 106 mounts a "Full Cycle Park Switch" 110 which is a so-called blade switch and which is biased open. Similarly, the plate 106 mounts a "Half Cycle Park Switch" 112 which is also a blade switch and which is biased closed. The gear 104 carries a lobe 114 for engaging the blade portion 110a thereby to bias switch 110 closed momentarily once during every full revolution of the gear 104. Similarly, the gear 104 includes another cam lobe 115 for engaging the blade portion 112a to bias the switch 112 momentarily to the open position once every revolution of the gear 104. It will be observed the switches 110, 112 and the actuating lobes on the gear 104 are spaced at different distances radially of the latter thereby to insure that each switch is actuated only once for every one revolution of the gear.

(c) The magazine indexing mechanism

As noted in FIG. 2, the teeth 30 on the slide magazine 10 are in meshing engagement with an indexing gear 118, the latter being rotatably mounted in a cavity 119 formed in the top wall 29 of the projector housing. The gear 18 includes a central hub portion 120 extending downwardly through a central opening 121 in the cavity 119, such hub portion 120 mounting another gear 122. It will be understood the gears 118, 122 are connected together for rotation in unison.

Referring now primarily to FIGS. 2, 5, 8 and 9, the indexing mechanism includes a bracket plate 124 mounted in parallel spaced relation beneath the projector top wall 29 by means of a pair of fasteners 125, associated spacers 126, and by a further fastener 127 extending through a collar 128 and threadingly engaged in a suitable central aperture formed in the hub 28. As noted in FIG. 9, the bracket plate 24 includes a pair of openings 130 for receiving the fasteners 125, and another opening 131 for receiving the fastener 127. Further, the plate 124 includes an aperture 132 which receives the lower end of a pin 120a serving to connect the gears 118 and 122 together. Finally, the plate 124 includes rectangular opening 134 the purpose of which will be explained hereinbelow.

Figure 8:
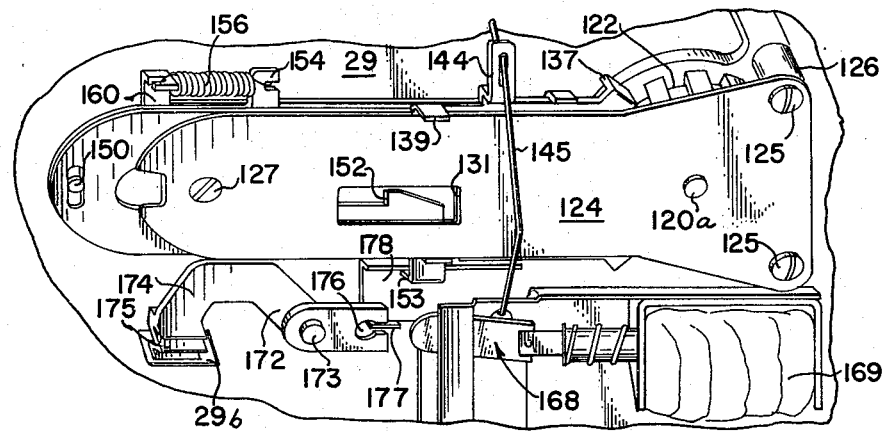
FIG. 8 is a perspective view as seen looking upwardly at the underside of the top wall of the projector housing and showing the indexing mechanism.
Figure 10:
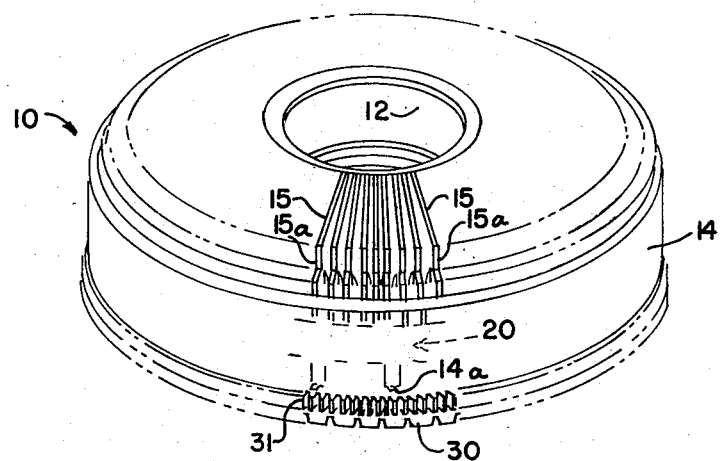
FIG. 10 is a perspective view of the slide magazine.

Slidably mounted on the upper surface of the bracket plate 124 is an indexing plate 136, the latter including integral indexing dogs 137, 138 for alternate engagement with the teeth of gear 122 to rotate the latter in either direction. The plate 136 also includes downwardly extending, integral tabs 139 which alternately abut opposite side edges of the bracket 124 to limit horizontal or lateral shifting movement of the indexing plate 136. The plate 136 also includes an elongated opening 140 for slidably and rotatably receiving hub 128. A generally rectangular opening 141 is formed in the indexing plate, one edge of this opening, 141a, being slightly arcuate in shape. A transversely extending slot 142 is formed in the end of the indexing plate 136 which is adjacent the opening 140. The indexing plate also includes an integral tab 144, the latter being stepped downwardly from the main body portion of the plate 136 and being provided with a slot 144a to receive one end of a stiff wire 145 (FIGS. 7 and 8).

Mounted immediately above the indexing plate 136 is an actuating plate 147. This actuating plate includes an elongated slot 148 of the same size and shape as the opening 140 in the plate 136. The opening 148 slidably and rotatably receives the hub 128. The actuating plate 147 also includes an opening 149 snugly receiving one end of a pin 150, the latter extending freely into the slot 142 in the indexing plate 136. The plate 147 includes an extended portion 147a defining a catch 152. The extended portion 147a also mounts an integral, upstanding tab 153. Finally, the actuating plate 147 includes a laterally extending integral tab 154 having a recess 154a for receiving one end of a coil spring 156 as best seen in FIGS. 7 and 8.

Mounted above the actuating plate 147 in vertical spaced relation therewith is a locking plate 158. This plate includes an elongated opening 159 slidably and rotatably received in an annular groove 128a (FIG. 6) formed in the hub 128 above an enlarged portion 128b. The plate 158 also includes an integral, downwardly extending tab 160 having a recess 160a for receiving the other end of the spring 156. The locking plate further includes a longitudinally extending, rectangular slot 161 and a longitudinally extending, open ended slot 162, the latter slidably receiving a centering pin 163 suitably supported from the underside of the projector wall 29 as noted in FIGS. 2 and 5. The locking plate includes a pair of locking teeth 164 adapted for locking engagement with the teeth on gear 122 as best seen in FIG. 7. Finally, the locking plate 158 includes a pair of downwardly extending, integral tabs 166 which engage the upper surface of the indexing plate 136 for holding the latter and the plate 158 in parallel spaced relation.

The gear 122 is rotated in either direction upon actuation of the indexing mechanism depending on whether the indexing plate 136 is positioned for bringing the dogs 137 or 138 into engagement with the teeth of this gear. The indexing plate 136 is shifted back and forth between "forward" and "reverse" positions by an overcenter linkage arrangement, generally designated 168, which arrangement is connected to the wire 145. Such overcenter linkage arrangement, which is actuated by a solenoid 169, may be of the type disclosed in Golden United States Patent 3,130,637.

It will be understood that by reason of this overcenter linkage arrangement and the connection of the wire 145 to the indexing plate 136, the latter will be disposed or cocked to either side of the bracket plate 124. Solenoid 169, which controls the overcenter linkage assembly 168, is of course operated by a suitable "forward-reverse" control member (not shown) on the projector housing.

The operation of the slide indexing mechanism is as follows: At the outset, it should be stated that the operating tab 102 on the cam-operated plate 97 extends through openings 134, 141 and 161 in respective plates 124, 136 and 158. Further, the actuating plate 147 is positioned such that the catch 152 is located to be engaged by the tab 102 upon movement of the plate 97 to the right. Assume that the overcenter linkage assembly 168 has been actuated for positioning the indexing plate 136 as illustrated in FIG. 7 wherein the dog 138 is positioned for engaging the teeth on the gear 122. Assume also that the teeth 164 and the locking plate 158 are engaged with the teeth on the gear 122 for locking the latter, thereby to lock the slide magazine against rotation, as will be the case when the slide is being projected in the gate. When a slide changing cycle is initiated, as will be explained more fully hereinbelow, the plate 97 will be in a center position, i.e., at the midpoint of its horizontal stroke, and will commence moving to the left thereby imparting corresponding movement to the tab 102. This tab will engage the end 161a of the slot 161 thereby shifting the locking plate 158 to the left, i.e., to its unlocked position, thereby withdrawing the teeth 164 from the teeth of the gear 122. During movement of the tab 102 to the left, the same will also strike the edge 141a of the indexing plate 136 thereby also to withdraw the same slightly to the left for positioning the dog 138 to engage a successive tooth on the gear 122.

As the slide changing cycle continues, the tab 102 commences movement to the right. Just prior to the time the tab 102 returns to its center position described above, the same strikes the catch 152 on the actuating plate 147. Since the actuating plate is positively connected to the indexing plate 136 by reason of the pin 150, the indexing plate will commence moving to the right for bringing the dog 138 into engagement with a successive tooth on the gear 122 thereby imparting counterclockwise rotation (FIG. 7) to the latter. This movement to the right of the actuating plate 147 will also cause corresponding movement to the locking plate 158 by reason of engagement of these two plates via spring 156. Initially, the locking teeth 164 will contact the teeth outer surfaces 122a and will not enter the spaces between the teeth until the gear 122 has been indexed through an arcuate amount which equals 360° divided by the number of teeth on the gear. This arcuate amount is such that the slide magazine is indexed or rotated an amount for bringing a successive slide-receiving space over the projection gate. As noted in FIG. 7, detent means in the form of a spring bar 170 are provided for detenting the gear 122 after every such increment of arcuate movement. After indexing has been completed, the tab 102 will commence movement to the left and will return to its center position. This final leftward movement of the tab does not bring about actuation of the indexing mechanism or the locking mechanism because of the lost motion connections defined by the tab 102 and the plate openings 141, 161.

(d) The magazine latch

Means are provided for releasably latching the slide magazine in its place on the top of the projector housing. Referring now to FIGS. 6 through 8, such means include a latch member 172 pivotally mounted intermediate the ends thereof on a pin 173, the latter being appropriately mounted from the underside of the top wall 29 of the projector housing. The latch includes a generally hook-like portion 174 having a stepped-up end extending through an opening 29b in the projector wall and being received within a cavity 28a in the hub 28. This stepped-up end of the catch includes a finger 175 which, when the latch 172 is in one position thereof, overlies the magazine flange 26 thereby to prevent separation of the magazine from the projector. The other end of the latch 172 includes an open ended slot 176 receiving a tab 177 integral with a plate 178.

As noted in FIGS. 6 and 7, the plate 178 is elongated and extends horizontally toward one corner of the projector housing. The plate 178 is provided with an opening (not shown) receiving one end 180a of a pivot arm 180. This arm is pivotally mounted on a pin 181, the latter being suitably mounted from a bracket 182 in turn connected to a right angle bracket 183. This last mentioned bracket is fixedly mounted in the projector housing. The arm 180 has its other end 180b received in an opening (not shown) formed in a vertically extending bar 185 which has the upper portion thereof offset and mounting a "Load" button 186. It will be understood that suitable means are provided for mounting the bar 185 for limited vertical reciprocal movement. Spring means (not shown) are preferably provided to urge the bar 186 to the up position. It should be apparent that when the "Load" button 186 is depressed, as by the operator's finger, the bar 178 will be shifted to the right (FIG. 6) for rotating the latch 172 to withdraw the finger 175 from its position overlying the magazine flange 26 thereby permitting removal of the magazine from the projector and mounting of the magazine on the projector.

(e) The indexing mechanism disabling means

It will be noted the plate 178 includes another flange 188 which is positioned for striking the tab 153 on the actuating plate 147. When the "Load" button 186 is depressed for withdrawing the tray latch as just described, the flange 188 strikes the flange 153 and cocks the actuating plate 147 so the catch 152 thereof will not be engaged by the operating tab 102. This results in disabling the indexing mechanism. As explained in the aforementioned Bennett application, when using a Random Access Attachment having a separate indexing gear arranged for engagement with the teeth 31 on the magazine 10, it is desirable to disable the normal indexing means including the gear 118 which meshes with the teeth 30.

(f) The electrical system

As noted in FIG. 6, the bracket 183 mounts three blades 190, 191 and 192 defining in effect two pairs of electrical contacts. To this end, the blades 191 and 192 mount respective contact buttons 191a and 192a which are normally closed. The blade 191 has a bent upper end 191b which is normally spaced from the blade 190. The bar 185 carries a wedge member 194. When the "Load" button 186 is depressed, the wedge 194 comes between the blades 191, 192 thereby opening the contacts 191a, 192a, and substantially simultaneously bringing the blade end 191b into contact with the blade 190 and thereby establishing electrical contact between the blades 190 and 191. The operation of the two sets of contacts defined by the three blades 190, 191 and 192 will become apparent from the following description of the electrical schematic of the projector.

Turning now to FIG. 13, the lines from a suitable power source, such as 117 v. A.C., are designated 196 and 197, the former being connected to a contact 198 associated with a Main Power Switch 199 having an actuating member 200. The other line 197 is directly connected to the windings 45a of the motor 45. The switch 199 includes a "Fan" terminal 201, the latter being directly connected to the winding of the motor 45 and also to one terminal of a Random Access Socket 202, the latter being used when the aforementioned Bennett Random Access Attachment is connected to the projector. The switch 199 includes another terminal 204, which may be termed as the "Lamp" terminal, this terminal being connected through the projector lamp 205 to the other line 197 and also to one of the terminals in the Random Access Socket 202. It will be understood that when the switch actuating member 200 is moved to the "Fan" position for bridging the contacts 198 and 201, power will be supplied to the motor 45 which operates, among other components, the usual cooling fan (not shown). When the actuating member is moved to the "Lamp" position thereby bridging the contacts 198, 201 and 204, the motor 45 will remain energized and the lamp 205 will also be energized. When the actuating switch member is in this position, power is also applied to the Random Access Socket 202.

One of the motor windings 45b is tapped as at 206 so as to provide approximately 28 v. A.C. for powering the various components of the projector to be mentioned hereinbelow. The tap 206 is connected to a solenoid 207; this solenoid operates the clutch 46a which drives the shaft 46 from the motor 45. It will be noted the solenoid 207 is connected to terminals of the Half Cycle Park Switch 112, which is biased to the open position, and to the Full Cycle Park Switch 110, the latter being biased to the closed position.

The following referred to projector components which are illustrated schematically in FIG. 13 form no part of the present invention and are mentioned only for purposes of completeness of disclosure. The winding 45b is center tapped, as at 209, thereby to provide approximately 6 v A.C. for powering a focus motor 210. The projector focusing mechanism may be constructed according to that shown in Golden United States Patent 3,263,558. The focusing motor 210 is connected to one terminal 212a of a Remote Control Socket 212. This socket may be adapted to receive the remote control handpiece shown in Hall United States Patent 3,221,598. Other terminals 212b, 212c and 212d of the Remote Control Socket 212 are respectively connected to the "forward-reverse" solenoid 169, to the blade contact 191, and to the terminals of the switches 110, 112 and solenoid 207. A so-called "defeat" switch is represented at 214; this switch is explained in the aforementioned Bennett application—it comes into play only when the Bennett Random Access Attachment is put into use. The projector timer is generally designated 215; it may be of the type shown in Szymber United States Patent 3,342,963 which discloses and claims a thermally responsive or bimetal timer member. A complete slide changing cycle, i.e., slide changing and indexing, is commenced either by actuation of the timer or by actuating a "Cycle Switch" (not shown) which bridges terminals 212c and 212d.

(g) Operation

The operation of the projector and magazine according to the present invention is as follows: Assume the switch actuating member 200 is in the "Lamp" position and assume further that a slide is being projected in the gate. Under these conditions, the slide-lifting arm 50 and the slide-releasing arm 76 will be in the positions illustrated in FIG. 2, and the shutter 68 will of course be in the open position as indicated in phantom lines in FIG. 5. The "Load" button 186 will be in its up position, and the arrangement of the various switches will be as indicated in FIG. 13.

The slide changing mechanism is operated during a complete slide changing cycle, of course, and also whenever the "Load" button 186 is depressed. The operation of the projector will first be explained herein in conjunction with operation of the "Load" button 186 for mounting a loaded magazine on the projector.

The "Load" button 186 is momentarily depressed for withdrawing the latch finger 175 thereby to permit mounting of the magazine. As this movement of the "Load" button establishes contact between the contact blades 190 and 191, it will be seen that the solenoid 207 is energized through the normally closed Half Cycle Park Switch 112. Energizing the solenoid 207 brings the clutch 46a into operation thereby to cause rotation of the shaft 46 in a clockwise direction as shown in the various figures. As the gear 104 commences to rotate, the lobe 114 will separate from the blade end 110a of the Full Cycle Park Switch allowing the latter to snap to the closed position almost immediately.

The aforementioned rotation of the shaft 46 causes clockwise rotation of the cam 47 thereby commencing upward movement of the lifting arm 50 by reason of the engagement of cam surface 47a with the flanges 51a, 51b. Normally a slide will not be in the gate at this time.

During this initial movement of the shaft 46, corresponding rotation will be imparted to the cam 54 thereby to swing rocker arm 57 in a clockwise direction about its supporting pin 56. This movement of the rocker arm will allow movement of the shutter pin 73 thereby to permit the spring 71 to swing the shutter arm 65 to the left for swinging shutter 68 to the closed position indicated in broken lines in FIG. 5.

When the shaft 46, and the various cams carried thereby, have rotated through approximately 180° or a half cycle, the lifting arm 50 will have been swung to its uppermost position, the shutter will remain closed (further clockwise swinging movement of the rocker arm has no effect on the shutter pin 73 because of the lost motion connection resulting from the opening 57c being much larger than this pin), and the operating plate 97 will have shifted from the so-called initial or center position, to the limit of its movement to the left and will then have moved to the right returning to the center position. The initial movement of the tab 122 to the left from its center position will result in fully withdrawing the locking plate 158 from the teeth on the indexing gear 122. During this movement of the plate 97 to the right, the tab 122 on the operating plate will not come into engagement with the catch 152 since the "Load" button is down thereby holding the plate 147 in its position for disabling the indexing means. As soon as the lobe 115 on the gear 104 opens the Half Cycle Park Switch 112, the solenoid 207 will be de-energized. Although the Full Cycle Park Switch 110 will be closed at this time, it does not serve to energize the solenoid 207 since the contacts 191a, 192a will be separated as the "Load" button is in its depressed position.

When the "Load" buttton is released and allowed to pop up, the contacts 191a, 192a are allowed to close thereby energizing the solenoid 207 through the closed Full Cycle Park Switch 110. As the shaft 46 continues to rotate, the plate 97 will continue its movement to the right by reason of the action of the cam 96 on the shaft 46. When the "Load" button was released, the plate 147 will have been allowed to return to its normal position. However, at this time tab 122 will have already passed the position adjacent the catch surface 152 and therefore the indexing means are not placed into operation upon release of the "Load" button. During this continued movement of the shaft 46, the lifting arm 50 commences to lower. As the shaft 46 continues to rotate, the cam surface 54c begins to come into engagement with the surface 58 of the rocker arm 57, thereby bringing the latter into engagement with the flange 43c of the plate 43 thereby to shift the slide guide 42 to the left to open the gate for reception of a slide. This movement of the slide guide 42 commences to swing the slide-release arm 76 to the left by reason of the engagement between the latter and the inclined surface 42b on the slide guide 42. During this same period of time, the cam lobe 91b on the cam 91 comes into engagement with the cam follower 90 thereby to shift the cross-arm 85 to the right for commencing lifting movement of the elevating member 80. This member forces the slide-releasing arm 76 upwardly where the upper end 76a thereof will be in a position to contact the end 23b of the spring finger which is disposed over the projection gate. The end 76b of the releasing arm will not come into engagement with the spring retaining finger in the slide magazine until the magazine has been fully indexed and locked in proper position by engagement of the locking teeth 164 with the teeth on gear 122. Shortly after this occurs, the slide-releasing arm 76 will have been elevated to its uppermost position. Then, the cam surface 54c causes further or final leftward movement of the plate 43. This action brings the slide guide projection 42c into engagement with the slide-releasing arm 76 thereby imparting final swinging movement of the latter to the left for shifting or biasing one of the spring fingers 23a to the left thereby to release the slide and allow the same to drop into the expanded gate. At this time, the lifting arm 50 will be near its lowermost position. As the shaft 46 completes its full revolution, the cam 54 will be positioned such that cam following surface 58 on the rocker arm 57 will be allowed to be received in the recess 54b of the cam thereby causing the trailing edge of the opening 57c to contact shutter pin 73 and open the shutter against the force of the spring 71 and also allowing the gate to contract, i.e., the slide guide 42 to shift to the right for gripping the slide. This movement of the slide guide 42 also allows the spring 77 to return the slide-releasing arm to the right, i.e., the position illustrated in FIG. 2. The final movement of the shaft 46 also positions the cam 91 such that the cross-arm 85 is allowed to return to the left under the influence of the spring 94 whereupon the elevating member 80 is lowered allowing the slide-release arm 76 to be lowered completely within the slot 29a as shown in FIG. 2. During this final one half cycle, the tab 122 on the plate 97 will have shifted to its limit of movement to the right and then will have moved to the left returning to the so-called center position mentioned above. A slide will now be positioned in the gate for projection, and the various parts will be disposed for for commencing another cycle of operations as just described.

During a complete slide changing cycle, which is brought about either by operation of the timer or by actuation of the "Cycle Switch" (not shown) which bridges the contacts 212c, 212d, the "Load" button is not depressed and therefore the contacts 191a and 192a remain in engagement. During a complete slide changing cycle, assuming such cycle is initiated by bridging the contacts 212c, 212d, it will be seen the solenoid 207 will be energized and a slide changing operation will be commenced as explained above. The contacts 212c, 212d are bridged only momentarily, but when opened the solenoid 207 will continue to be energized because at that time the Full Cycle Park Switch 110 will be closed. The only difference in the cycle of operation from that explained above will be that the indexing mechanism will be brought into operation. As the tab 122 moves to the right and approaches its center position, it will engage the catch 152. Continued movement of the tab 122 to the right during the final 180° movement of the shaft 46 will cause the dog 137 to be brought into engagement with one of the teeth on the indexing gear 122 thereby indexing the magazine to position the next slide-receiving space therein over the projection gate. After this next slide-receiving space is positioned over the gate, the slide-releasing arm 76 then comes into operation for releasing the slide allowing the same to drop into the expanded gate. It will be appreciated that during a cycle of operation initiated either by bridging the contacts 212c, 212d, or by operation of the timer, opening and closing of the Half Cycle Park Switch 112 serves no purpose.

When the Bennett Random Access Attachment is used, the "Load" button 186 is mechanically held down until the selected slide space is positioned over the projection gate. Therefore, when the lobe 115 on the cam comes into engagement with the Half Cycle Park Switch 112, current to the solenoid 207 is interrupted and the slide changing mechanism is stopped at a so-called half cycle. As soon thereafter as the selected slide space is positioned over the projection gate by reason of the drive from the Random Access Attachment (the aforementioned indexing mechanism within the projector will be disabled since the "Load" button 186 will be held down—rotation to the magazine is imparted by reason of the drive through the magazine teeth 31), the "Load" button is allowed to pop up thereby establishing contact through the terminals 191, 192 and energizing the solenoid 207 (the Full Cycle Park Switch 110 will be closed at this time) for continuing the cycle of operation. The solenoid 207 will be de-energized, for terminating the cycle of operation, when the cam lobe 114 comes into engagement with the Full Cycle Park Switch 110 thereby opening the latter.

While the invention has been shown in but one form, it will be obvious to those skilled in the art it is not to be so limited. On the contrary, the invention is susceptible of various forms and modifications without departing from the spirit and scope of the appended claims.

I claim:

1. In a slide projector wherein slides are advanced from a magazine to a projection gate and are returned from the gate to the magazine, wherein the projector includes a housing having means therein defining said gate, which housing has a top wall portion with an opening therein positioned over said gate for entry of a slide thereinto and for exit of a slide therefrom, a slide magazine movably mounted on said top wall portion, which magazine includes side walls and partitions therebetween for defining a plurality of vertically disposed slide-receiving spaces, movement of said magazine along a predetermined path serving to present said spaces one at a time to a position over said opening, each of said spaces being open at the bottom thereof for movement of a slide therefrom and thereinto the improvement comprising:
   (a) slide-retaining means carried by the magazine and including a plurality of resilient fingers one in each of said spaces for engagement with a slide therein, said fingers yieldably engaging only the side edges of respective slides in said slide-receiving spaces and thereby acting as the sole means retaining slides in said spaces, each of said fingers having a lower end spaced horizontally away from the associated slide adjacent the bottom edge of the latter;
   (b) a generally vertically disposed arm movably mounted in said projector housing adjacent said gate, which arm in an initial position thereof has the upper end thereof disposed in said slot;
   (c) means for moving said upper end of said arm upwardly through said slot, then laterally and then returning the arm to its initial position, such upward and lateral movement of said arm upper end causing the latter to engage the lower end of one of said spring fingers for biasing the same away from a slide retained thereby whereupon the later falls by gravity into said projection gate; and
   (d) other means on said housing for lifting the slide in said gate and returning the same to its space in the magazine.

2. The improvement according to claim 1 further defined by:
   (a) each of said fingers having a slide-engaging portion joining with a downwardly extending portion which terminates at said lower end; and
   (b) said downwardly extending portion being inclined away from the side edge of the associated slide in the plane thereof, whereby such finger portion is adapted to be engaged by the slide upon upward return movement thereof, such engagement causing the finger to be deflected laterally to allow return of the slide to its space in the magazine.

3. The improvement according to claim 1 wherein said means for moving said arm upper end includes:
   (a) a slide guide member forming part of said projection gate, said guide member being mounted for movement back and forth between a first position wherein the guide member frictionally engages one side edge of the slide for holding the same in the gate and a second position wherein the guide member is in spaced relation from such side edge of the slide, a surface movable with said guide member and being in engagement with said arm whereby movement of the guide member from its first to its second position serves to move said arm laterally;
   (b) biasing means holding said arm in engagement with said surface;
   (c) an elevating member engaged with said arm for moving the same upwardly from its initial position;
   (d) linkage and cam means for moving said elevating member and said guide member in sequence thereby to impart said upward and lateral movements to said upper end of said arm and for allowing return of said arm to its initial position.

4. In a slide projector of the type including, a projector housing and means defining a projection gate, said housing having a top wall portion with a slot therein disposed over the gate for entry of a slide thereinto and for exit of a slide therefrom, a slide magazine mounted for movement over said gate for one-at-a-time presentation of the slide-receiving spaces therein to a position over said slot, which magazine serves to hold slides in vertically disposed array, the improvement comprising:
   (a) yieldable retaining means in each of said spaces for releasably retaining a slide therein, which retaining means are wholly disposed within the confines of said magazine and which engage only one side edge of each slide, each retaining means serving to release the associated slide when the former is shifted laterally, each of said retaining means having a portion thereof shaped for being engaged by a slide upon return of the latter to the magazine, such engagement causing the retaining means to be deflected laterally to allow entry of such slide into its space in the magazine;
   (b) slide-releasing means in said housing and normally disposed within said slot, which releasing means includes a release member for one-at-a-time engagement with each retaining means;
   (c) said releasing means including operating means for; (1) lifting said release member upwardly through said slot and into said magazine for engagement with the retaining means disposed over the slot, and (2) laterally shifting said release member thereby also to shift the engaged retaining means for release of the associated slide into the gate; and
   (d) other means in the projector for returning the releasing means to its normal position and for returning the slide to its space in the magazine.

5. The improvement according to claim 4 further defined by:
  (a) said gate including a pair of vertically disposed parallel slide guide members;
  (b) means mounting at least one of said guide members for movement toward and away from the other guide member for alternately releasing and gripping a slide in the gate; and
  (c) means connecting said release member with said one guide member such that movement of one of these members causes movement of the other.

6. In a slide projector of the type including, a projector housing and means defining a projection gate, said housing having a top wall portion with a slot therein disposed over the gate for entry of a slide thereinto and for exit of a slide therefrom, an open bottomed slide magazine mounted for movement over said gate for one-at-a-time presentation of the slide-receiving spaces therein to a position over said slot, which magazine serves to hold slides in vertically disposed array in the spaces therein, the improvement comprising:
  (a) yieldable retaining means in each of said spaces for releasably retaining a slide therein, which retaining means engage only one side edge of each slide, each retaining means serving to release the associated slide when the former is shifted laterally, each retaining means being shaped such that it will be deflected laterally upon being engaged by the associated slide upon upward return movement of the latter thereby to allow return of the slide to its space in the magazine;
  (b) slide-releasing means in said housing mounted adjacent said gate and said slot, which releasing means include a release member for one-at-a-time engagement with each retaining means;
  (c) said releasing means including operating means for bringing said release member into engagement with the retaining means disposed over the slot and for moving such release member thereby to shift the engaged retaining means and release the associated slide for dropping into said gate; and
  (d) lifting means in said projector for engaging the slide in the gate and for forcing the same upwardly to its space in the magazine upon corresponding upward movement of such lifting means; and
  (e) powered means alternately imparting said movement to said release member and said lifting means so that only one of said movements occurs at any one time.

7. In a slide magazine including side walls and partitions secured therebetween for defining a plurality of vertically disposed slide-receiving spaces each being open at its top and bottom thereby permitting loading and editing of slides at the top of the magazine and releasing and returning the slides at the bottom of the magazine, the improvement comprising, slide-retaining means in each of said spaces for frictional gripping engagement with opposite side edges of a slide therein, the means establishing said gripping engagement constituting the sole means retaining the slide against downward gravitational movement, said retaining means including a yieldably mounted element engageable with one side edge of the slide and being movable away from such side edge to allow the slide to drop from the magazine by the force of gravity, said element being constituted by a spring finger having a rounded portion for engagement with said adjacent side edge of a slide and a distal end portion disposed beneath said rounded portion, the distal end portion being spaced from the adjacent edges of the slide to facilitate engagement by a slide-receiving member, said rounded portion adapting said element such that upon being engaged by the slide it will deflect to allow entry of the slide into the associated slide-receiving space from both the top and the bottom of the magazine.

8. In a slide magazine, including side walls and partitions secured therebetween for defining a plurality of vertically disposed slide-receiving spaces each being open at its top and bottom thereby permitting loading and editing of slides at the top of the magazine and releasing and returning the slides at the bottom of the magazine, the improvement comprising, slide-retaining means carried by the magazine and including a yieldably mounted element in each of said slide-receiving spaces, said element being disposed adjacent one side wall of the magazine and biased against the adjacent side edge of the slide thereby cooperating with the other side wall of the magazine for frictionally gripping the slide against downward gravitational movement, said element and said other side wall constituting the sole means retaining the slide against downward travel, movement of said element away from said other side wall serving to release the slide for downward gravitational movement, said element being constituted by a spring finger having a rounded portion for engagement with said adjacent side edge of a slide and a distal end portion disposed beneath said rounded portion, the distal end portion disposed beneath said rounded portions, the distal end portion being spaced from the adjacent edges of the slide to facilitate engagement by a slide-releasing member, said rounded portion adapting said element such that upon being engaged by the slide it will deflect to allow entry of the slide into the associated slide-receiving space from both the top and the bottom of the magazine.

9. In a slide projector having a housing with a top wall portion for supporting a slide magazine and having means in the housing defining a projection gate, which top wall portion is provided with a slot arranged over said gate for entry of a slide thereinto and for exit of the slide therefrom, the improvement comprising:
  (a) a slide release member movably mounted in said housing and being disposed adjacent said gate, said member being adapted upon movement in one direction to cooperate with slide-releasing means of an associated slide magazine thereby to release a slide for downward entry into said gate;
  (b) a pair of vertically disposed slide guide members forming part of said projection gate, at least one of said guide members being mounted for generally horizontal movement, in a plane perpendicular to the projector optical axis, back and forth between a first position wherein said one guide member frictionally engages one side edge of a slide holding the same in the gate and a second position wherein said one guide member is spaced from said first position in a direction away from the other guide member thereby opening the gate for free reception of a slide thereinto;
  (c) means connecting said slide release member and said one guide member together such that movement of one of the latter members causes movement of the other member and thereby substantially simultaneously to cause movement of said release member in said one direction and movement of said guide member to its second position; and
  (d) powered operating means connected to one of the last mentioned members for moving the same.

10. In a slide projector having a housing with a top wall portion for supporting a slide magazine and having means in the housing defining a projection gate, which top wall portion is provided with a slot arranged over said gate for entry of a slide thereinto and for exit of the slide therefrom, the improvement comprising:
  (a) said projection gate being defined by first and second means which include vertically disposed slide-engaging surfaces, said first and second means being movable generally horizontally relative to each other back and forth between a closed position wherein said first and second means cooperate to hold a slide in projection position and an open position wherein a slide may drop freely into the gate;
(b) slide release means adjacent said projection gate and adapted upon movement thereof in one direction to cooperate with a slide-release element in an associated slide magazine supported by said top wall portion for releasing a slide for downward entry into said gate;
(c) means establishing an engagement between said first means and said release means such that said movement of one causes said movement of the other; and
(d) operating means connected to one of said last mentioned means for imparting said movements to said first means and said release means, respectively.

References Cited

UNITED STATES PATENTS

| | | |
|---|---|---|
| 2,221,753 | 11/1940 | Bodie. |
| 2,931,115 | 4/1960 | Pester et al. |
| 2,931,116 | 4/1960 | Boughton. |
| 3,146,666 | 9/1964 | Misuraca. |
| 3,209,647 | 10/1965 | Hall. |
| 3,276,314 | 10/1966 | Robinson. |
| 3,336,836 | 8/1967 | Gould et al. |

NORTON ANSHER, Primary Examiner

R. M. SHEER, Assistant Examiner

U.S. Cl. X.R.

353—111, 116, 117